United States Patent

Ramanarayanan et al.

[11] Patent Number: 5,158,693
[45] Date of Patent: Oct. 27, 1992

[54] OLIGOQUINOLINIUM METAL OXIDE SALTS AS SULFUR CORROSION INHIBITORS

[75] Inventors: Trikur A. Ramanarayanan; Long Y. Chiang, both of Somerset, N.J.

[73] Assignee: Exxon Research and Engineering Co., Florham Park, N.J.

[21] Appl. No.: 751,858

[22] Filed: Aug. 29, 1991

[51] Int. Cl.⁵ ............................................. C08G 73/06
[52] U.S. Cl. .................................. 252/8.555; 428/628; 428/660; 428/661; 428/684; 428/469; 427/250; 427/255.1; 427/255.4; 252/389.1; 252/390; 252/394
[58] Field of Search ............... 252/387, 389.54, 390, 252/394, 8.555, 389.1; 106/14.44; 428/660, 662, 628, 661, 684, 469; 427/34, 236, 237, 239, 250, 255.1, 255.4

[56] References Cited

U.S. PATENT DOCUMENTS

| | | | |
|---|---|---|---|
| 4,028,268 | 6/1977 | Sullivan et al. | 252/8.55 C |
| 4,341,657 | 7/1982 | Quinlan | 252/390 |
| 4,387,041 | 6/1983 | Hort et al. | 252/392 |
| 4,676,834 | 6/1987 | Treybig | 106/14.15 |
| 4,763,729 | 8/1988 | Ramanarcyanan | 252/8.555 X |
| 4,820,591 | 4/1989 | Ramanarayanan | 428/628 |
| 4,880,907 | 11/1989 | Chiang | 528/423 |
| 4,913,980 | 4/1990 | Rowcliffe et al. | 428/660 |
| 4,971,938 | 11/1990 | Chiang et al. | 502/167 |
| 4,981,949 | 1/1991 | Chiang et al. | 528/423 |
| 5,032,469 | 7/1991 | Merz et al. | 428/660 |

Primary Examiner—Deborah L. Kyle
Assistant Examiner—Valerie Fee
Attorney, Agent, or Firm—Jay Simon

[57] ABSTRACT

Quartenized derivatives of oligoquinoline have been reacted with refractory metal oxysalts to generate oligoquinolinium metal oxide salts which provide excellent corrosion inhibition of iron based alloy articles in sulfur containing media.

10 Claims, 1 Drawing Sheet

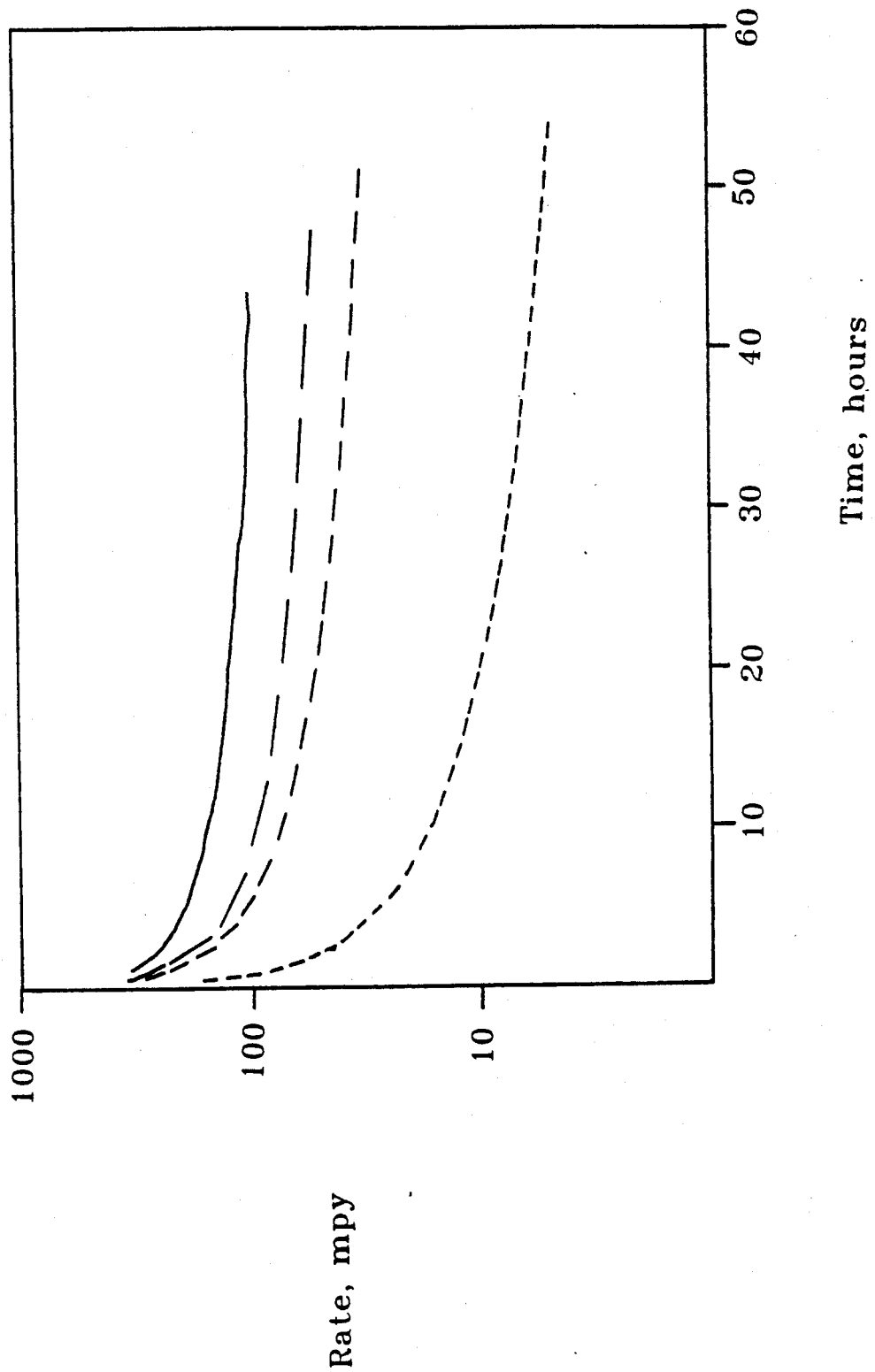

OLIGOQUINOLINIUM METAL OXIDE SALTS AS SULFUR CORROSION INHIBITORS

BACKGROUND OF THE INVENTION

1. Field of the Invention

The present invention relates to a corrosion inhibitor composition containing a combination of oligoquinoline derivatives and refractory metal oxide.

2. Background of the Prior Art

In deep well gas and oil production there is a need to control the degree of metal corrosion caused by sulfur-compound environments, such as those containing hydrogen sulfide. In these "sour gas" applications, the drilling components and tubing extending into the well, are exposed to acidic environments containing extremely high levels of hydrogen sulfide, combined with carbon dioxide, brine, and hydrocarbons. The iron-containing alloys in these components react with hydrogen disulfide to form ferrous-sulfide phases, e.g., iron sulfide forms on carbon steel. This scale comprises various iron sulfide phases, such as pyrite, marcasite ($FeS_2$), pyrrhotite ($Fe_{1-x}S$), and mackinawite ($Fe_{1+x}S$). Ferrous ions are rapidly transported across sulfide phases, such as pyrrhotite, and react with the sulfur containing compound at the outer surface leading to corrosion.

Carbon steel tubes are used for economic reasons since more corrosion resistant materials significantly increase the overall cost of the operation. Many types of corrosion mitigation compounds have been suggested for use as corrosion inhibitors. For example, U.S. Pat. No. 4,028,268 describes a multicomponent inhibitor formulation containing quaternized cyclic nitrogen bases, specific acetylenic alcohols, a specific surface active agent and a formic acid derivative. U.S. Pat. No. 4,387,041, describes an aqueous composition which comprises an acid and 3-dialkylamino-3-(substituted phenyl)-prop-1-yne. U.S. Pat. No. 4,341,657, discloses polymers derived from quinolines and pyridine compounds as being useful components for inhibiting metal corrosion in acidic environments. The polymers, referred to are polyquinolines and polypyridines that have no repeating quinoline or pyridine moieties in their respective structures. U.S. Pat. No. 4,676,834, discloses a corrosion inhibitor composition that includes the reaction product of quinoline, for example, with cycloaliphatic mono-aldehyde. U.S. Pat. No. 4,763,729, describes forming a corrosion resistant layer upon the addition of inhibitors based on refractory metal salts. U.S. Pat. No. 4,880,907 discloses the use of quaternary salts of quinoline oligomers as corrosion inhibitor compositions in the acid environments.

Notwithstanding the teachings in these references, the search for new and improved compounds that are more effective in inhibiting corrosion continues. Particularly desirable are inhibitors that provide corrosion protection against sulfur-containing acidic solutions and show improved high temperature stability. Such compounds would be well-suited for corrosion control in deep well drilling and producing operations.

SUMMARY OF THE INVENTION

The invention relates to a corrosion inhibitor composition for iron-containing alloys exposed to sour gas/liquid environments at temperatures ranging from room temperature to about $+300°$ C. and comprises an oligoquinoline and a refractory metal selected from Group IVB or Group VB metals, typified by the formula:

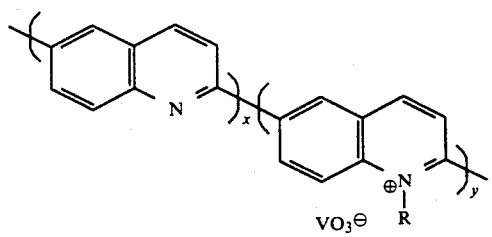

where $x+y$ ranges from 2 to 15 while $y/(x+y)$ ranges from 0.2 to 1 and where R is $-H$, $-CH_3$ or $-CH_2-C_6H_5$. The refractory metal group is $VO_3-$ in the above example, can be any Group IVB or VB refractory metal oxy group such as niobate, tantalate, etc.

BRIEF DESCRIPTION OF THE FIGURE

FIG. 1 shows a comparison of the corrosion rate of carbon steel in mils per year (mpy) in an $H_2S$-saturated chloride medium at 300° F. with and without an inhibitor. The figure illustrates that the oxy vanadium oligomeric quinolinium compounds of the present invention provide up to 92% corrosion inhibition.

DETAILED DESCRIPTION

In accordance with the present invention a method for inhibiting the corrosion of iron-containing alloys is disclosed wherein such alloys may be steel and more commonly carbon steels. The ferrous sulfide scale that develops as part of the corrosion mechanism is modified in order to suppress ferrous ion transport through the iron-containing alloy and, therefore, control the amount and rate of corrosion. An inhibitor is described which is the refractory metal oxy salt of oligoquinolinium compounds. The refractory metal part of the inhibitor provides corrosion resistance by entering the lattice of the iron sulfide corrosion product and blocking iron transport. It has been found that Group IVB and VB refractory metals, which are heavier than, iron, and have a greater affinity for sulfur than iron, are the best candidates to suppress iron transport. The oligoquinolimum part of the inhibitor provides a chemisorbed surface barrier film on the iron sulfide surface, thus keeping reactants away from the corroding interface. The preparation of the inhibitor is described below. Basically, commercial grade 1,2,3,4-tetrahydroquinoline can be used to form the quinoline oligomers or polyquinolines without further purification. U.S. Pat. No. 4,727,135 describes a catalytic dehydrogenation process for preparing quinoline oligomers, using a rhenium sulfide catalyst. The rhenium sulfide used is an amorphous powder with a surface area of about 0.02 m²/g to about 30 m²/g and is prepared by reacting ammonium perrhenate or rhenium (v) chloride with hydrogen sulfide or lithium sulfide. U.S. Pat. Nos. 4,971,938 and 4,981,949 describe activated transition metal sulfide catalyst compositions for the efficient preparation of quinoline oligomers and are incorporated herein by reference.

The quaternary oligoquinolinium salts used in this study were prepared by reacting the quinoline oligomers with alkylating agents selected from p-alkylbenzyl halides, dialkyl sulfates, dialkoxy carbonium salts and trialkyloxonium salts of the formula:

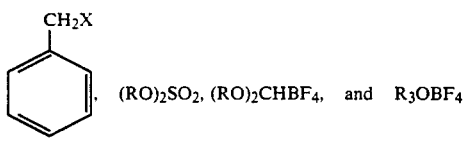, $(RO)_2SO_2$, $(RO)_2CHBF_4$, and $R_3OBF_4$ wherein X is Cl, Br, or I and R is an alkyl group having from 1 to about 20 carbon atoms. For example, oligoquinoline may be converted to the quaternary compound with a dialkyl sulfate by the reaction:

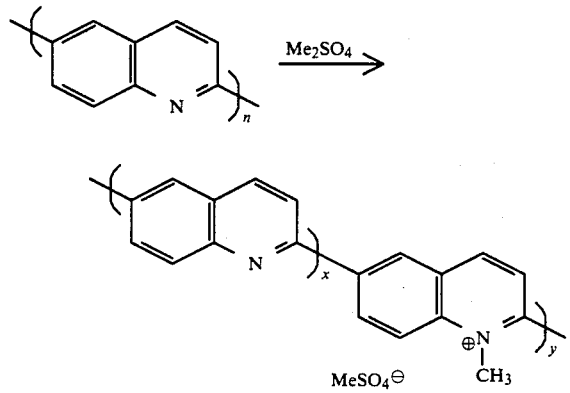

The quaternary oligomeric quinoline compound is then reacted, by preparing a solution, with a Group IVB or Group VB refractory metal, preferably in the salt form, to form refractory metal quinolinium metal oxide salts. The solution then evaporated leaving the crystalline inhibitor. The reaction chemistry proceeds as follows:

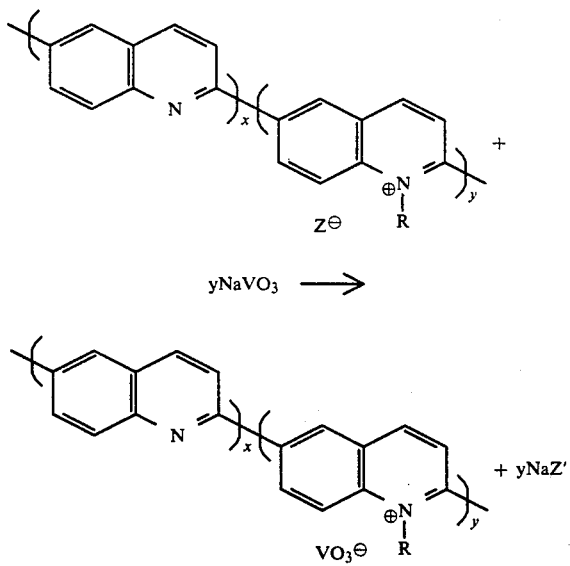

where (x+y) ranges from 2 to 15 and y/(x+y) ranges from 0.2 to 1.0; R represents H, $CH_3$, or $CH_2$—$C_6H_5$; Z' is an anion selected from Cl, or $MeSO_4$, wherein Cl— is the preferred anion when R is H or $CH_2C_6H_5$ and $MeSO_4$— is the preferred anion when R is $CH_3$.

The concentration of the quaternary salt used will vary over a wide range; however, preferred amounts range from about 0.001 to about 1 weight percent (based on the weight of methylquinolinium salt). The amount of Group IVB or Group VB metal required preferably ranges from about 0.001 to about 0.01%; and more preferably ranges from about 0.005% to about 0.05%. Particularly effective refractory metal salts are the meta-, ortho- and pyro-vanadates, i.e., $NaVO_3$, $Na_4VO_4$ and $Na_4V_2O_7$. In the method of use as a corrosion inhibitor, the metal is contacted with a solution comprising the refractory metal and the oligoquinoline in an amount ranging from 0.005 to about 2 weight percent based on the total weight of solution.

In the practice of this invention one embodiment consists of an iron-containing tubular article situated in a well from which oil or gas is extracted through the tubular article in the well known manner. Incident to this extraction, the interior portion of the article is in contact with a sulfur compound-containing corrosive medium which typically contains hydrogen sulfide. The combined oligomeric quinolinium oxysalt and refractory metal salt composition is, for example, introduced so as to contact the interior surfaces of the alloy article to produce the corrosion resistant layer or film on the interior portion of the article.

While not wishing to be bound by theory, it is believed that the oligomer quinoline salt portion of the composition provides a surface film that chemisorbs on the iron sulfide scale, keeping the sulfur-containing corrosive species away, while the refractory metal diffuses into the ferrous sulfide scale and retards ferrous iron transport through the scale. This dual behavior of the composition results in superior corrosion inhibiting properties.

The invention will be more fully understood by reference to the following examples. The examples illustrate modifications to particular embodiments of the invention and should not be construed as limiting the scope thereof.

EXAMPLE 1

Preparation of Vanadium Oxysalt of Oligomeric Quinoline

Oligomeric methyl quinolinium methyl sulfate (11 g) was dissolved in water (200 ml) to form solution A. In a separate flask, sodium metavanadate (6.7 g) was dissolved in water (500 ml) at a temperature of 90° C. to form solution B. Solution A and B were slowly added together and the temperature of the mixture was maintained at 90° C. A partial precipitation occurred immediately after the addition. After stirring for one hour at 90° C., the mixture was then cooled to ambient temperature which allowed for complete precipitation. The precipitate was filtered from the mixture, washed with water, and vacuum dried. The product recovered was oligomeric methyl quinolinium metavanadate (10.3 g).

EXAMPLE 2

No Corrosion Inhibition

Comparative Example

A sample of 4130 grade carbon steel was placed in an electrochemical cell containing 45% $MgCl_2$ saturated with $H_2S$ at a temperature of 300° F. An electrochemical polarization technique was used to measure the corrosion rate as a function of time. The corrosion rate, having units of mils per year, gradually decreased from a value of 400 mpy to a value of 100 mpy. The gradual decrease in the rate of corrosion was due to the rapid growth of the ferrous sulfide surface layer. The layer provided increasing resistance to corrosion as it grew since the diffusion distance for ferrous ions through the layer increases. Within about 40 hours, the corrosion rate stabilized at a value of 100 mpy. This example shows that ferrous ions are transported through the iron sulfide scale at a steady rate. The results are shown in FIG. 1 by the upper most, solid line curve which represents an uninhibited sample.

EXAMPLE 3

Oligomethyl Quinolinium Sulfate Corrosion Inhibition

Comparative Example

A flask was fitted with probes for electrochemical corrosion rate measurements and 650 ml of a 45% MgCl$_2$ solution was added. Argon was continuously bubbled through the solution which was maintained at a temperature of 300° C. for a period of 8 hours. As the argon was bubbled through, poly methyl quinolinium sulfate was added to a concentration of 0.008%. The argon was replaced with H$_2$S and a sample of 4130 grade carbon steel was introduced into the solution. The corrosion rate of the carbon steel was monitored as a function of time. The corrosion rate deceased gradually from an initial value of 300 mpy and stabilized at a final value of 63 mpy in approximately 47 hours. The results are shown in FIG. 1 by the second curve from the top and indicate that poly methyl quinolinium sulfate provides approximately 37% corrosion inhibition relative to an untreated steel.

EXAMPLE 4

Sodium Meta Vanadate Corrosion Inhibition

Comparative Example

A 45% MgCl$_2$ solution, similar to that in Example 3, was prepared. Argon gas was bubbled through the solution. Sodium metavanadate was added to a concentration of 0.008%. The argon was replaced by H$_2$S and a sample of 4130 grade carbon steel carbon was introduced into the solution. The steady state corrosion rate for the sample is illustrated by the third curve from the top in FIG. 1. Sodium metavanadate provides approximately 65% corrosion inhibition.

EXAMPLE 5

Oligo Methyl Quinoline

Meta-Vanadate Corrosion Inhibition

The procedure described in Example 4 was followed except that poly methyl quinolinium meta vanadate was added instead of sodium meta vanadate until the concentration in solution was 0.008%. The corrosion rate of the of 4130 grade carbon steel sample in the H$_2$S-saturated solution at 300° C. was electrochemically monitored as a function of time. The results are shown by the bottom curve in FIG. 1. The meta vanadate salt of poly methyl quinoline provides up to 92% corrosion inhibition.

What is claimed is:

1. A corrosion inhibitor composition for an iron-containing alloy comprising an oligoquinolinium salt and a refractory metal oxide anion having the structure

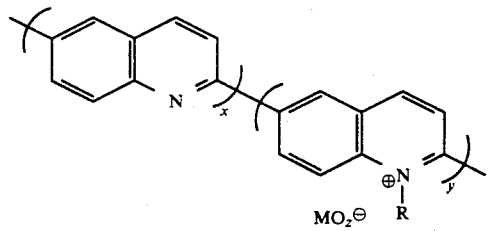

wherein (x+y) ranges from 2-15, and y/(x+y) ranges from 0.2 to 1, z is 2-5, and R is hydrogen, methyl, of methylbenzyl and M is selected from Group IVB or Group VB.

2. The composition of claim 1 wherein said oligoquinoline salt and refractory metal oxide anion is the formula structure:

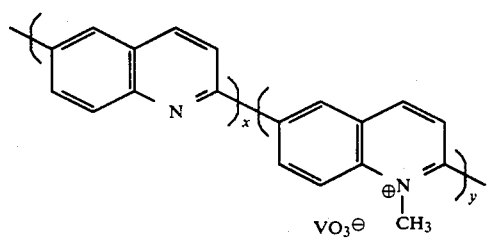

wherein the refractory metal anion is an oxyvanadium anion.

3. A method of inhibiting the corrosion of iron based metal in sulfur containing media which comprises forming on said metal a corrosion resistant sulfide layer by contacting said metal with a solution comprising a refractory metal selected from Group IVB or Group VB in the form of an oxysalt and an oligoquinoline in the form of a quaternized derivative having the structure:

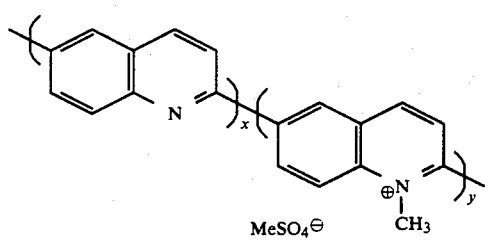

wherein (x+y) ranges from 2-15 and y/(x+y) ranges from 0.2 to 1.

4. The method of claim 3 wherein the oligoquinoline and refractory metal oxysalt are present in solution in an amount ranging from about 0.005 to about 2 weight percent based on the total weight of solution.

5. The method of claim 3 wherein said iron-containing alloy is steel.

6. The method of claim 5 wherein said steel is carbon steel.

7. The method of claim 3 wherein the refractory metal oxide is selected from the group consisting of metavanadate, orthovanadate and pyrovanadate.

8. The method of claim 7 wherein the refractory metal oxide is metavanadate.

9. The method of claim 7 wherein the refractory metal oxide is orthovanadate.

10. The method of claim 7 wherein the refractory metal oxide is pyrovanadate.

* * * * *